Patented Oct. 17, 1939

2,176,091

UNITED STATES PATENT OFFICE 2,176,091

FABRICATING VINYLIDENE CHLORIDE POLYMERIC PRODUCTS

Richard S. McClurg and Donald L. Gibb, Midland, Mich., assignors to The Dow Chemical Company, Midland, Mich., a corporation of Michigan No Drawing. Application October 23, 1937, Serial No. 170,628

3 Claims. (Cl. 18—57)

The present invention relates to a method for fabricating polymeric or co-polymeric vinylidene chloride.

The product obtained by polymerizing vinylidene chloride per se or with other polymerizable materials, such as vinyl chloride, methyl methacrylate, styrene, and the like, ranges from a light, fluffy powder through a porous solid to a hard, bone-like material. The product may be cast or molded by the application of heat and pressure, generally employing a small amount of a plasticizing agent, such as hexachloro-diphenyloxide, phenoxy-propylene oxide, or styrene oxide, to lower the softening point of the polymer, and to modify its plastic character. The ultimate tensile strength of sheets or plates obtained by molding vinylidene chloride polymeric derivatives is generally not above about 4000 pounds per square inch. It is desired to increase the tensile strength and to improve certain other properties of the material.

We have now found that a very marked improvement in the physical properties of sheets, plates, and the like made from polymeric and co-polymeric vinylidene chloride can be obtained by subjecting such sheet at temperatures substantially below the softening point thereof, to a rolling operation to effect a thickness reduction of said sheet. The sheet may be rolled entirely along one axis, but is preferably cross-rolled or rotated through an angle of 90° between passes through the rolls, to produce a sheet which has an increased ultimate strength, regardless of the axis along which the test specimen is cut from a rolled sheet.

The following example illustrates the practice of our invention. A sheet 4" square and 0.035" thick was molded at a temperature of about 160° C. under a pressure of 625 pounds per square inch, from a polymeric composition prepared by polymerizing vinylidene chloride with 10 per cent by weight of styrene oxide. This sheet was found to have an ultimate tensile strength varying between about 3700 and about 4000 pounds per square inch. One of the 4" square plates was passed through the rolls of an ordinary metal-rolling mill at room temperature, the roll setting being reduced 0.005" after each pass, and the direction of rolling of the sheet being changed by about 90° between each pass. The rolling operation was continued until the plate was reduced to a sheet approximately 7" square and 0.012" thick. The ultimate tensile strength of sheets rolled in this manner averaged about 6700 pounds per square inch.

It is to be noted that when a sample of the rolled sheet was subjected to tension, the elongation was proportional to the stress applied until the specimen ruptured under the applied stress. That is to say, the stress-strain diagram of a rolled sample of a sheet of polymeric vinylidene chloride, when prepared in accordance with the conditions of the above example, follows Hooke's law throughout. By way of contrast, a sample of the un-rolled molded vinylidene chloride material, when subjected to tension, exhibited first a period of stretch in proportion to the stress exerted, second, a substantial plastic flow while the stress remained approximately constant, and finally, a second interval in which the elongation was proportionate to the stress applied until rupture occurred.

The most striking result of rolling polymeric or co-polymeric vinylidene chloride sheets is evidenced when the un-rolled and rolled sheets are tested in a Tinius Olsen folding endurance tester. We have determined that the un-rolled sheet will normally break after about twenty thousand 270° double bends around a 1 millimeter radius in said tester, while a sheet of similar thickness which has been rolled will stand above seven hundred fifty thousand 270° double bends around a 1 millimeter radius.

Results similar to those as set forth in the above example can be had on compositions prepared by polymerizing together vinylidene chloride with vinyl chloride, styrene, methyl methacrylate, and other polymerizable materials, the rolled material obtained having in each case at least a 25 per cent increase in ultimate tensile strength, being capable of undergoing at least 20 times as many double bends as the un-rolled product, and following Hooke's law when subjected to tension.

The polymeric vinylidene chloride sheet being rolled may be heated to a temperature not exceeding about 100° C. between passes through the rolls, although this is not essential. Polymeric and co-polymeric vinylidene chloride can be rolled without appreciable edge-cracking. While we have described our invention more particularly with respect to the fabrication of rolled sheets, the improved method of treating vinylidene chloride polymers may be applied to the formation of other shapes of finished products having a uniform cross-section throughout their length, for example, rods, bars, channels, and the like, by employing suitably profiled rolls for the rolling operation.

We claim:

1. A polymeric vinylidene chloride article prepared by rolling a pre-formed polymeric vinylidene chloride product having uniform cross-section through its length between rolls suitably profiled to said article, to effect a thickness reduction of at least 50 per cent, which article is characterized by having a tensile strength at least 25 per cent greater than that of the un-rolled blank, and by exhibiting stretch in accordance with Hooke's law, without plastic flow, when a sample thereof is subjected to tension.

2. A process which comprises passing a pre-formed sheet of polymeric vinylidene chloride through rolling equipment to effect a reduction in the thickness thereof, thereafter cross-rolling the sheet of reduced thickness to effect a still further reduction in the thickness of said sheet, and repeating said series of operations until the thickness of the original pre-formed sheet has been reduced at least 50 per cent, all said operations being carried out at temperatures substantially below the softening point of the polymer, the rolled sheet being characterized by having an ultimate tensile strength at least 25 per cent greater than that of the un-rolled sheet, by being capable of withstanding at least 20 times as many double bends as the un-rolled sheet, and by exhibiting stretch in accordance with Hooke's law without plastic flow when a sample thereof is subjected to tension, regardless of the axis of the sheet along which the sample is cut.

3. A sheet of polymeric derivative of vinylidene chloride prepared by rolling a pre-formed blank between pressure rolls spaced apart a distance less than the original thickness of the un-rolled sheet and cross-rolling the sheet between pressure rolls spaced apart a distance less than the longitudinally rolled sheet, said rolling being accomplished at temperatures substantially below the softening point of the said polymeric derivative, the rolled sheet being characterized by having an ultimate tensile strength at least 25 per cent greater than that of the un-rolled sheet, by being capable of withstanding at least 20 times as many double bends as the un-rolled sheet, and by exhibiting stretch in accordance with Hooke's law without plastic flow when a sample thereof is subjected to tension, regardless of the axis of the sheet along which the sample is cut.

RICHARD S. McCLURG.
DONALD L. GIBB.